United States Patent [19]
Scott

[11] Patent Number: 5,613,826
[45] Date of Patent: Mar. 25, 1997

[54] SYSTEM TO OPTIMIZE THE STACKING EFFICIENCY OF OBJECTS

[75] Inventor: Warner C. Scott, Dallas, Tex.

[73] Assignee: Texas Instruments Incorporated, Dallas, Tex.

[21] Appl. No.: 389,088

[22] Filed: Feb. 14, 1995

Related U.S. Application Data

[63] Continuation of Ser. No. 99,685, Jul. 29, 1993, abandoned.

[51] Int. Cl.$^6$ ............................ B65G 67/60; B65G 69/00
[52] U.S. Cl. .................. 414/786; 414/789.6; 414/792.7; 414/143.2; 414/902
[58] Field of Search ................................ 414/786, 792.9, 414/792.7, 902, 794.9, 796.5, 797.4, 797.8, 788.1, 789.3, 789.6, 789.7, 141.3–141.8, 142.6–142.8, 143.2

[56] References Cited

U.S. PATENT DOCUMENTS 4,641,271 2/1987 Konishi et al. ................. 414/902 X
5,175,692 12/1992 Mazouz et al. ................. 414/902 X

FOREIGN PATENT DOCUMENTS 5457745 9/1979 Japan ................................. 414/902
62-36225 2/1987 Japan ................................. 414/902

Primary Examiner—Andres Kashnikow
Attorney, Agent, or Firm—W. Daniel Swayze, Jr.; W. James Brady, III; Richard L. Donaldson

[57] ABSTRACT

A method of stacking objects such that various factors are considered. These factors include: 1) what objects are to be removed from the stack; 2) the number of stacks that have no objects stacked; 3) the number of objects to be removed from a stack; 4) the number of stacks of objects to be stacked and the number of objects to be stacked before the object to be stacked; and 5) the number of objects to be removed from the stack after the object to be stacked.

11 Claims, 4 Drawing Sheets

SYSTEM TO OPTIMIZE THE STACKING EFFICIENCY OF OBJECTS

This application is a continuation of application Ser. No. 08/099,685, filed Jul. 29, 1993, now abandoned.

TECHNICAL FIELD OF THE INVENTION

This invention relates to method and apparatus of optimizing the stacking of objects, particularly the objects located in a container freight-yard.

BACKGROUND OF THE INVENTION

A large percentage of goods shipped from one point to another point is shipped within a standard size container. This container is approximately 8–10 feet wide and high and approximately 20–40 feet long. These containers are typically packed by the customer of the shipping company and transported by truck to a centralized freight-yard normally located at the dock-side of the shipping vessel. These containers are temporarily stored in the freight-yard until the shipping vessel which is to carry the containers to their destination arrives in port. If these containers were packed arbitrarily within the shipping vessel's hold, the order in which the containers were loaded onto the vessel would not matter. However, in fact, the shipping vessel is loaded in a preplanned order. The preplanned order in which a particular container is loaded into a shipping vessel, typically is a follows:

1) the heaviest containers are placed in the deepest portion of the hold of the shipping vessel in order to maximize the vessel's stability;

2) flammable or explosive cargo are loaded above-deck of the shipping vessel for safety reasons;

3) containers which are needed to be refrigerated are clustered around available sources of electric power; and 4) containers are distributed from the starboard side of the shipping vessel to the portside of the shipping vessel such that the net capsizing torque caused by the containers and other cargo is as close to zero as possible.

The cumulative result of the above-mentioned rules is that the shipping company loading the shipping vessel determines very precisely the loading order of the containers once the shipping vessel arrives in port. Thus, the containers are placed upon the shipping vessel in a very specific and defined order. FIG. 1 shows a typical cross-section of the shipping vessel. Location (101) illustrates the proposed location for Container No. 74168829B weighing 39 tons and containing ½" hex nuts which is being shipped to Shanghai by the Chock-Full of Nuts Metal Fastener Company of Terrell, Tex. Furthermore, location (103) illustrates the proposed location for Container No. 61992801C weighing 2.4 tons and containing styrofoam wig stands being shipped to the same port by Airhead Plastic Company of College Station, Tex.

Thus, as can be very dearly seen, the containers need to be placed in the hold in a very specific order to place each container at the correct location. Additionally, once the hold of the shipping vessel has been filled, the hatch of the shipping vessel is closed at deck level, and additional containers are stacked above-deck of the shipping vessel. The loading of containers above-deck begins at the center of the ship and proceeds outwards alternately starboard to port, preserving the ship's stability against capsizing. Additionally, once a stack has begun at a given location by the placement of containers, all of the containers to be loaded in this stack are loaded sequentially because the loading cranes used to load the ship includes controls that automatically return the crane to a preset position so that additional containers are placed at the same preset position; this feature reduces the need for the train operator to manually judge the position by "eyeballing" the location of the stack in order to place subsequent containers. Additionally, the container is loaded bottom-up to conform with the law of gravity.

As the above-description implies, loading of the shipping vessel requires a very specific loading order of containers in order to achieve the abovedescribed placement of containers.

Prior to being loaded onto the shipping vessel, the containers arrive at the dock at different times. Additionally, the space at dock-side for these containers is limited simply because the dock-side space is limited and/or expensive. In order to optimize the limited dock-side space, the containers are packed one on top of another to increase the dock-side effective capacity.

The loading company generally has no control over the order in which the containers arrive, and, as a consequence, the containers could be indiscriminately stacked on one another, up to five containers deep. Very likely, the containers that are to be loaded into the shipping vessel first are actually placed under containers which are to be subsequently loaded. Since as described above, the order that the containers are to be loaded onto the shipping vessel is of paramount importance, a great deal of time and resources are wasted by moving containers to temporary locations, and these moved containers are subsequently loaded in order to load the shipping vessel in the correct order.

It would be advantageous for the loading company if the containers could arrive to the dock in the reverse order which the containers are to be loaded into the shipping vessel. This would result in the containers which are to be loaded onto the ship last, being located at the bottom of each stack of containers. For practical reasons, the loading company cannot control the order that the containers arrive. However, these containers to be loaded onto the ship last need to be placed at the bottom of the stack for the efficient loading. The containers which are to be loaded on the ship first are stacked at the top of each stack. Thus, with respect to the loading order, inverted stacks are required. However, as stated above, the loading company does not have the resources to schedule their arrivals, and the loading company accepts and stores the arriving containers in the order in which they actually arrive.

Furthermore, the containers should not be stacked too high, one on another, since the stability of the stack cannot be maintained once the number of stacked containers reaches a predetermined number. Thus, many shipping companies will only stack a maximum of 3 or 4 containers in order to prevent the pile from falling over and damaging the container and contents of the container. As illustrated in Example 1, three containers are placed on top of each other such that the container to be loaded into the ship first is loaded on top, labeled 1, the container to be loaded onto the ship second is in the middle, labeled 2 and the container to be loaded on the ship third is located on the bottom of the stack, labeled 3.

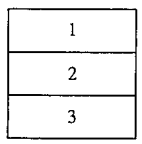

EXAMPLE 1

Example 1 illustrates an optimal stacking order since each of the containers can be removed from the stack and directly loaded onto the shipping vessel without the need to remove a container in order to obtain the next container to load on the shipping vessel.

In Example 2, a less-than-optimal stack is illustrated. Example 2 illustrates that for each of the two stacks, one container must be removed from the stack and temporarily stored in order that the containers be loaded onto the ship in the desired order.

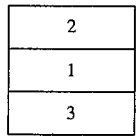 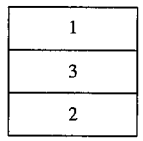

EXAMPLE 2

With respect to the left-most stack, the container on the top which is to be loaded second must be removed from the stack and temporarily stored at another location so that the container in the middle of the stack can be placed on the ship first. Likewise, with the right-most stack, after the uppermost container has been loaded onto the ship, the middle container which is to be loaded third must be removed from the stack and temporarily stored at another location in order that the container on the bottom of the stack can be loaded onto the shipping vessel second.

As illustrated in Example 3, the containers are stacked in the least optimal manner for loading onto the shipping vessel. As can be very clearly seen from Example 3, the container to be loaded onto the shipping vessel first is located at the bottom of the stack, requiring the removal of both the uppermost container and the middle container in order to allow the lower container to be loaded onto the shipping vessel.

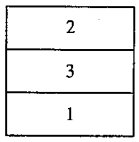

EXAMPLE 3

In conclusion, it can be seen that it would be desirable to eliminate the stacking arrangement as illustrated in both Examples 2 and 3. From the above description, it is very clearly seen that the stacking problem is not limited to containers to be loaded onto a shipping vessel. Very clearly, the problem extends to all objects that must be stacked on a stack and be removed in a desired order regardless of the reason.

SUMMARY OF THE INVENTION

The present invention provides a method for the placement of objects on a stack so that the object desired to be removed first from the stack is located on the top of the stack. Furthermore, the present invention is to provide a method for stacking objects such that the objects are stacked in the reverse order of removal. As each object is removed from the stack, the object remaining on top of the stack is the next object that is desired to be removed, avoiding the removal of the objects from the stack to obtain another object further down in the stack which is the desired object to be removed.

These and other features of the invention that will be apparent to those skilled in the art from the following detailed description of the invention, taken together with the accompanying drawings.

DETAILED DESCRIPTION OF THE INVENTION

Figure 1:
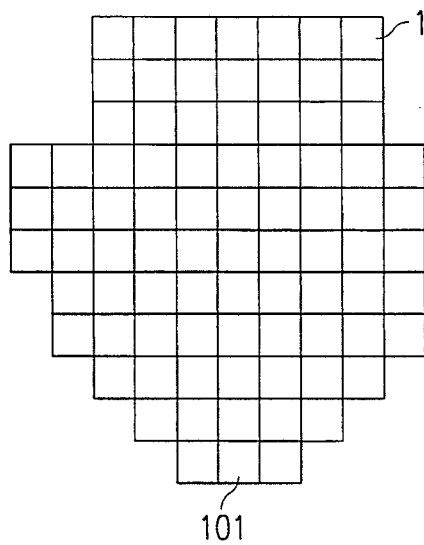
FIG. 1 is a block diagram illustrating the desired placement for the location of containers within a hold of a shipping vessel.
Figure 2:
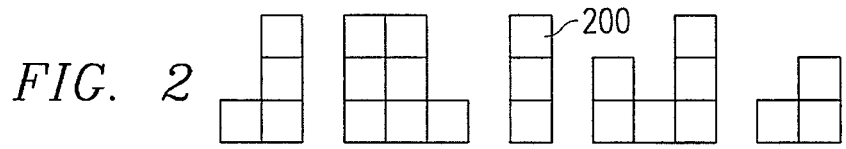
FIGS. 2 and 3 illustrate objects which have been stacked.
Figure 3:
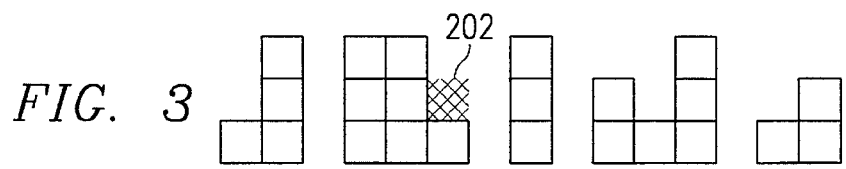

FIG. 2 illustrates various arrangements of stacks of objects that have been stacked in accordance with the present invention. The present invention is not limited to application of a particular stack stacked with a fixed number of objects. FIG. 3 illustrates the placement of object (202) in accordance with the present invention. The number of objects in a stack is compared to the number of incorrect stacking arrangements by the following two examples. As was discussed before, the number of stacks of objects is limited by the amount of area available to stack the objects. Thus, the number of objects in the stack of objects is an important consideration as illustrated by the following two examples. As the member of stacks increases, the number of objects in the stacks are reduced, reducing the likelihood of a bad stacking sequence which is a stacking sequence in which an object must be removed and placed at a temporary location to remove a desired object. In both Examples 4 and 5, four objects are to be stacked. Very dearly, the number of different ways in which these 4 objects can arrive is, namely, 4!=4*3*2*1 or 24 possibilities. As illustrated below in Example 4, the 24 possible combinations of objects to be stacked are illustrated with each object to be stacked having the possibility of being placed into two different stacks. Of the 24 stacking possibilities employing two stacks in Example 4, there are 12 bad stacking sequences in the hypothetical 48 stacks. The average bad stacking sequence is 0.25 per stack, obtainable by simple division. Thus, with four objects being stacked into two locations, for example, two stacks, the average stack height is 2.00.

Two Stacks

| 3 4 | | 4 3 | | 4 2 | | 4 2 | | 3 2 | | 2 |
|---|---|---|---|---|---|---|---|---|---|---|---|
| 1 2 | | 1 2 | | 1 3 | | 1 3 | | 1 4 | | 1 4 | 3 |
| 1234 | | 1243 | | 1324 | | 1342 | | 1423 | | 1432 |

| 1 4 | 1 3 | 1 4 | 4 1 | 1 3 | 1 3 |
|---|---|---|---|---|---|
| 2 3 | 2 4 | 2 3 | 2 3 | 2 4 | 2 4 |
| 2134 | 2143 | 2314 | 2341 | 2413 | 2431 |

| 1 4 | 1 2 | 1 2 | 2 1 | 1 2 | 2 1 |
|---|---|---|---|---|---|
| 3 2 | 3 4 | 3 4 | 3 4 | 3 4 | 3 4 |
| 3124 | 3142 | 3214 | 3241 | 3412 | 3421 |

(with "1" above column in positions 3214 and 3412 etc. as shown)

| 1 3 | 1 2 | 1 | 2 1 | 1 2 | 2 1 |
|---|---|---|---|---|---|
| 4 2 | 4 3 | 4 3 | 4 3 | 4 3 | 4 3 |
| 4123 | 4132 | 4213 | 4231 | 4312 | 4321 |

EXAMPLE 4

However, if the 24 possible stacks of the four objects were distributed into three stacking locations as illustrated by Example 5, there is only one bad stacking sequence within the 72 possible stacks, which yields an average bad stacking sequence per stack of 0.01389. The average stacking height of the objects is 1.33.

Three Stacks

| 4 | | 3 | 2 | 2 | 2 | 2 |
|---|---|---|---|---|---|---|
| 1 2 3 | 1 2 4 | 1 3 4 | 1 3 4 | 1 4 3 | 1 4 3 |
| 1234 | 1243 | 1324 | 1342 | 1423 | 1432 |

| 1 | 1 3 | 1 | 1 | 1 3 | 1 3 |
|---|---|---|---|---|---|
| 2 3 4 | 2 4 | 2 3 4 | 2 3 4 | 2 4 | 2 4 |
| 2134 | 2143 | 2314 | 2341 | 2431 | 2431 |

| 1 | 1 2 | 2 | 2 1 | 1 2 | 2 1 |
|---|---|---|---|---|---|
| 3 2 4 | 3 4 | 3 4 | 3 4 | 3 4 | 3 4 |
| 3124 | 3142 | 3214 | 3241 | 3412 | 3421 |

| 1 | 1 2 | 2 | 2 1 | 1 2 | 2 1 |
|---|---|---|---|---|---|
| 4 2 3 | 4 3 | 4 3 | 4 3 | 4 3 | 4 3 |
| 4123 | 4132 | 4213 | 4231 | 4312 | 4321 |

EXAMPLE 5

Figure 4:
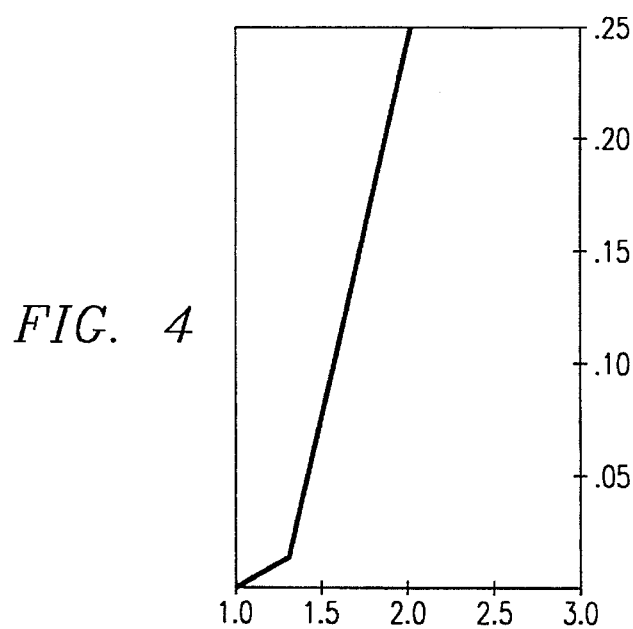
FIG. 4 is a graph illustrating the results of several examples of the stacking method.

FIG. 4 illustrates the results of Examples 4 and 5. The abscissa corresponds to the average stack height, and the ordinate corresponds to the average bad stacking sequence of objects. From FIG. 4, as the average stack height decreases, the probability of a bad stacking sequence decreases dramatically.

The rules which follow are not meant to be construed in the sense that the deletion of one or more rules from a method renders the method inoperative. Quite the contrary, the implementation of each of the above rules improves the number of bad stacking sequences per stack. The following rules have been illustrated by a maximum stack size of 4 objects; However, the maximum stack size could be any stack size.

Rule No. 1: Do not stack an object to be stacked on any stack having an object on top of the stack which is to be removed from the stack before the object to be stacked.

Rule No. 2: If the number of existing stacks is less than the maximum number of stacks allowable and a bad stacking sequence cannot be avoided by the placement of the object to be stacked on existing stacks, place this object on a new stack.

Rule No. 3: If the number of existing stacks is the maximum number of stacks allowable and a bad stacking sequence cannot be avoided, place the object on any stack by following Rule 9.

Rule No. 4: Determine the number of objects which have not yet been stacked and which is to be removed from the stack before the object to be stacked and label this number NBEFOR.

Rule No. 5: Again, determine the number of objects which have not been stacked and which are to be removed from the stack after the object to be stacked. Label this number NAFTER.

Next, determine the target stack size.

Rule No. 6: If NBEFOR is larger than NAFTER by a factor of 1.25, then the object to be stacked is the first object of a new stack. Although a factor of 1.25 has been chosen for the present example, other predetermined factors could be substituted to provide equally satisfactory results. However, if the number of existing stacks is the maximum number of stacks allowable, then place the object to be stacked on a stack having one object; if stacks having one object are not available or would result in a bad stacking sequence, then place the object on a stack having two objects; If a stack having two objects is not available or would result in a bad stacking sequence, then place the object on any stack in accordance with Rule 9.

Rule No. 7: Lastly, if NBEFOR is larger than NAFTER by a factor less than 1.25 or NAFTER is larger than NBEFOR by a factor less than 1.25, stack the object to be stacked in a stack having only one object. If the existing stacks do not have a stack having one object, then place the object to be started on any remaining existing stack; however, if a bad stacking sequence would result, then, stack the object to be stacked on any stack in accordance with Rule 9.

Rule No. 8: If NAFTER is larger than NBEFOR by a factor of 1.25, stack the object to be stacked on a stack having two objects. If the existing stacks do not have a stack having two objects or would result in a bad stacking sequence, then place the object to be stacked on any stack having one object. If the existing stacks do not have a stack having either two objects or one object or would result in a bad stacking sequence, then place the object on a new stack. If a new stack is not available, then, place the object to be stacked on any stack in accordance with Rule 9.

Rule No. 9: Determine a particular stack to place the object to be stacked.

Now that the target stack size has been determined, namely, the number of objects is two, one or zero stack, Rule 9 is employed to determine which particular stack of the stacks of the required target stack size to place the object to be stacked. This particular rule adds a great amount of efficiency to the object stacking procedure. During testing this rule improved the efficiency of the procedure by 100 times. Since the stack size has been previously determined, all the stacks evaluated in Rule 9 have the same stack size. Example 6 illustrates that, for example, a stack size of 2 has been chosen; however, this rule applies equally to all target stack sizes. The stack that is chosen is the stack which has an object to be removed from the stack most immediately after the object to be stacked on top of the stack. This procedure is illustrated in Example 6.

| Stack No. | 1 | 2 | 3 | 4 | 5 | 6 |
|---|---|---|---|---|---|---|
| | 65 | 77 | 90 | 53 | 58 | 81 |
| | 92 | 80 | 104 | 75 | 72 | 105 |

EXAMPLE 6

If the object to be stacked is to be loaded 51st onto the shipping vessel or removed 51st from the stack, then stack no. 4 is the best stack to place the 51st object satisfying Rule 9, since the object to be removed 53rd is positioned at the top of Stack No. 4. All of the other stacks, namely, numbers 1–3, 5 and 6, all have objects at the top of the stack which are to be removed from the stack after the object at the top of Stack No. 4 is to be removed. Namely, the 1st, 2nd, 3rd, 5th and 6th stack have objects to be removed, 65th, 77th, 90th, 58th and 81st, respectively. These are all to be removed from their respective stack after the object on top of the 4th stack, namely 53rd.

The reason why this rule is implemented is that the above-described stacking sequence achieves a minimum decreasing feature in space.

Figure 5:
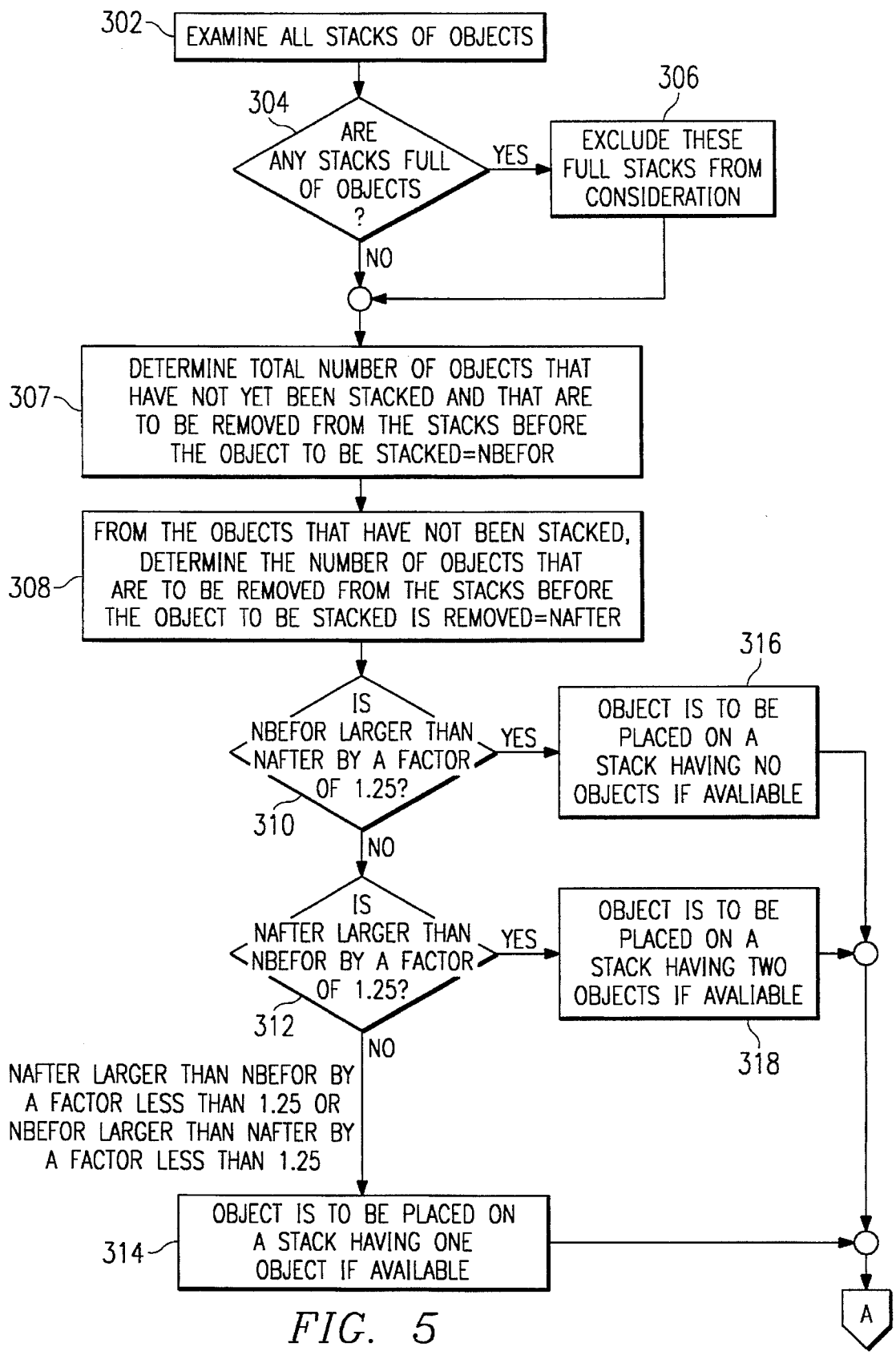
FIGS. 5 and 6 are flowcharts of the present invention.
Figure 6:
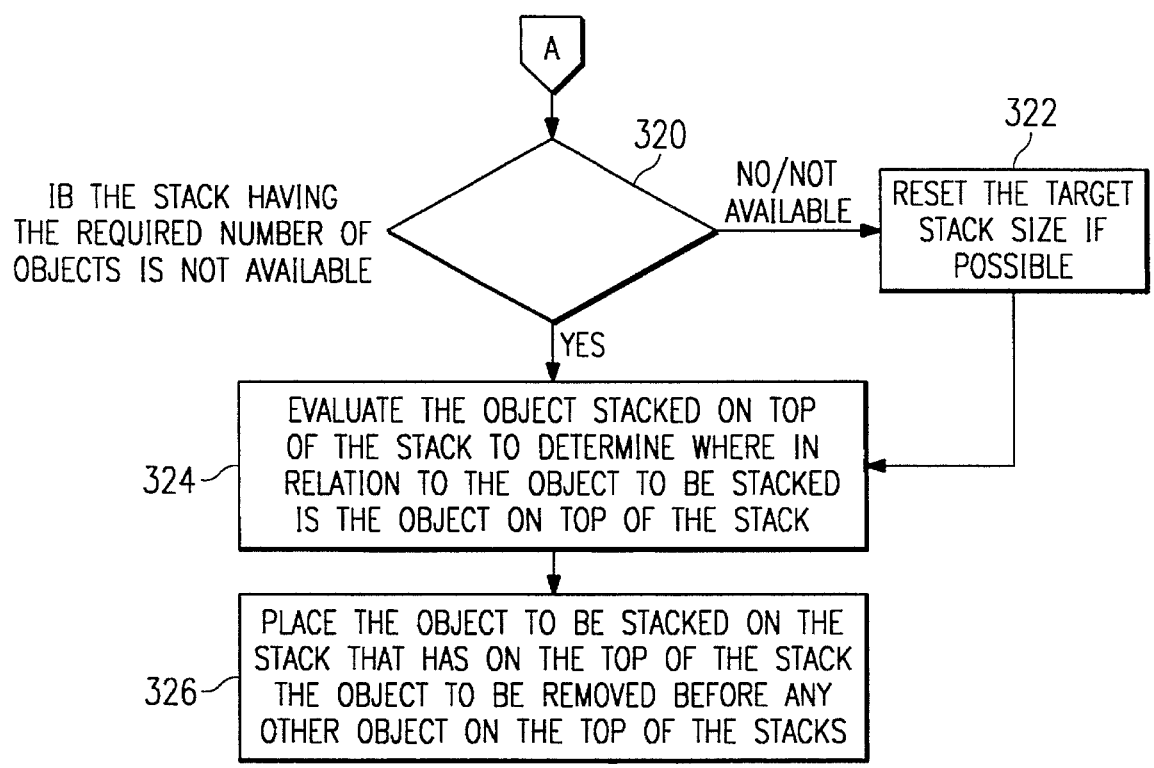

As illustrated in FIGS. 5 and 6, the operation of the object-stacking method is illustrated.

As an object to be stacked is obtained, the stacks of objects are examined as in Step 302. In Step 304, these stacks are examined to determine if any stacks are filled up to the predetermined limit, for example, 3 objects. If a particular stack is full, this stack is excluded from consideration in Step 306. In Step 307, the total number of objects that have not yet been stacked and that are to be removed before the object to be stacked is determined, and this total number is referenced by the variable NBEFOR. In Step 308, the number of objects that have not yet been stacked and are to be removed from the stacks after the object to be stacked is determined, this number is referenced by NAFTER.

The next group of Steps 310, 312, 314, 316 and 318 determines the target stack size, namely, if the object is to be placed on a new stack, placed on a stack that has one object to be removed, or placed on a stack that has two objects to be removed. Stop 310 determines if NBEFOR is larger than NAFTER by a factor of 1.25. If NBEFOR is larger than NAFTER by a factor of 1.25, then the object to be stacked is stacked on a new stack in Step 316. If NBEFOR is not larger than NAFTER by a factor of 1.25, then Step 312 determines if NAFTER is larger than NBEFOR by a factor of 1.25. If NAFTER is larger than NBEFOR by a factor of 1.25, then the object to be placed on a stack having two objects to be removed in Stop 318. If NAFTER is larger than NBEFOR by a factor of less than 1.25 or NBEFOR is larger than NAFTER by a factor of less than 1.25, the object to be stacked is placed on a stack having one object to be removed as in Step 314. Step 320 determines if a stack having the required stack size is in fact available. If the target stack size is not available, then Step 322 is executed. If the target stack size is originally two and there are no stacks available for the size, the target stack size is changed to one. If there are no stacks available for this size, the target stack size is reduced to zero. Rule 9 is applied next. If the target stack size is originally zero and there are no stacks available for this size, the target stack size is changed to one. If there are no stacks available for this size, namely a one, the target stack size is set to two. Rule 9 is applied next. If the target stack size is one and no stacks are available with this stack size, then Rule 9 is applied.

After the target stack size to place the object to be stacked has been determined, a specific stack to place the object must be chosen from one of the stacks available. As in Step 324, each stack which satisfies the above criteria of the proper target stack size is evaluated to determine the specific stack where the object to be stacked is to be placed in relation to the object to be removed first from the stack. It is desired to place the object to be stacked on the stack having an object to be removed sooner than an object to be removed from any other stack. In Step 326, the object to be stacked is stacked on the object to be removed before, sooner, or more immediately than any other object to be removed from the top of any other stack. As illustrated in previous Example 6, if the object to be stacked is to be removed as the 51st object to be removed, then the desired stack to place the object to be stacked is the stack having the 53rd object to be removed since the difference between the 51st object to be removed and the 53rd object to be removed is smaller than the difference between the 51th object to be removed and the object to be removed of any of the other stacks.

In testing the above sequence of steps, a group of 24 objects, a group of 66 objects and a group of 174 objects to be stacked were considered. It should be noted that these numbers of these groups of objects were chosen arbitrarily and subject to the condition that the number in groups be evenly divisible by three. The test could evaluate the most stringent case, for example, no position being unoccupied, that the average stack height is equal to three, for example, 22 locations for a group of 66 containers. In order to limit the number of cases which could be executed since the number of cases could be as large as 174!; the testing of the stacking procedure was tested for 5,000 times from 5,000 random choices.

Figure 7:
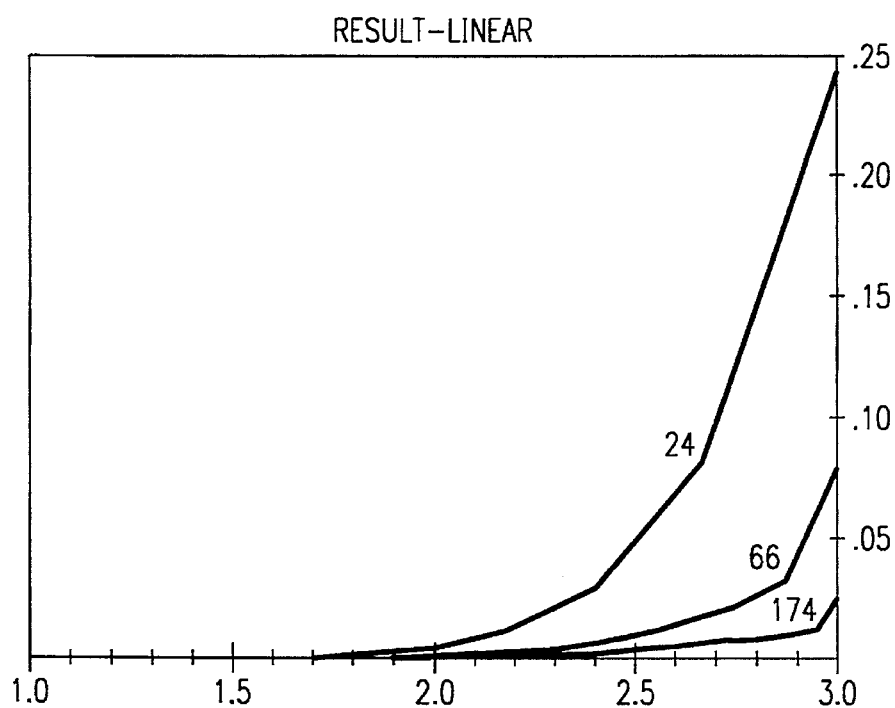
FIGS. 7, 8 and 9 are graphs illustrating the results of the present invention.

With 66 objects to be stacked and with stacking these objects 5,000 different ways, a total of 8,738 individual bad stacks were obtained corresponding to an average of 1.7476 bad stacks per stacking attempt. If this average of bad stack was per stacking attempt distributed among the 22 hypothetical stacks, an average number of bad stacks per stacking attempt per stack is 0.0794. This point is located in the upper right hand side of the graph labeled "66" of FIG. 7. Upon examination of the individual stackings, it was determined that approximately half of the bad stackings were obtained when the 66th or very last object was to be placed on the stacks and the procedure violated Rule 1, simply because the object had to be placed on the only stack that was left. To substantiate this observation, 23 instead of 22 locations were allocated for possible stacks, and of the 5,000 different object orders, 3,821 bad stacks were generated. This corresponds to 0.7642 bad stacks per stacking attempt or an average of 0.0332 bad stacks per stacking attempt per stack. As can be very clearly seen by comparing the two tests, the number of bad stacks is dramatically reduced. Furthermore, if the number of allocated spaces were increased, for example, to 24, 25, 26 or 27, the bad stacks per stacking attempt became smaller. As illustrated in FIG. 7, as the average number of objects per stack is reduced, the number of bad stacks per stacking attempts dramatically decreases. From FIG. 7, two conclusions can be drawn. First, additional locations in which to locate stacks improve the bad stacks per stacking attempts and secondly, the method achieves better results for a large number of objects than with a smaller number of objects.

Figure 8:
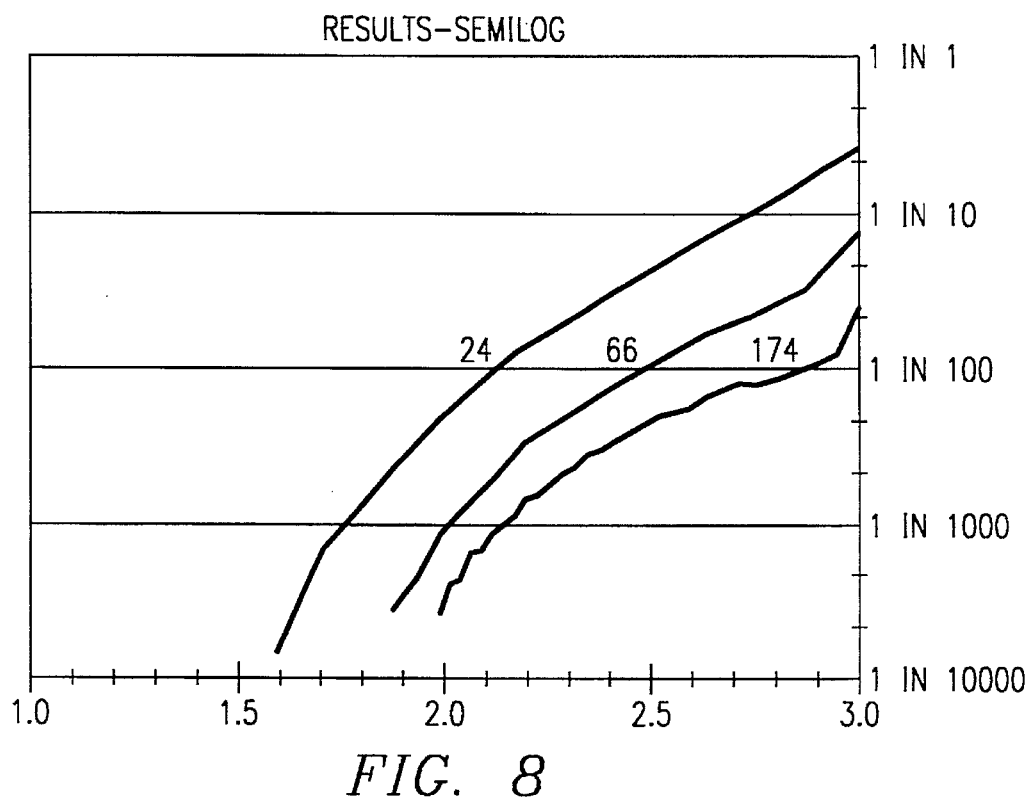
Figure 9:
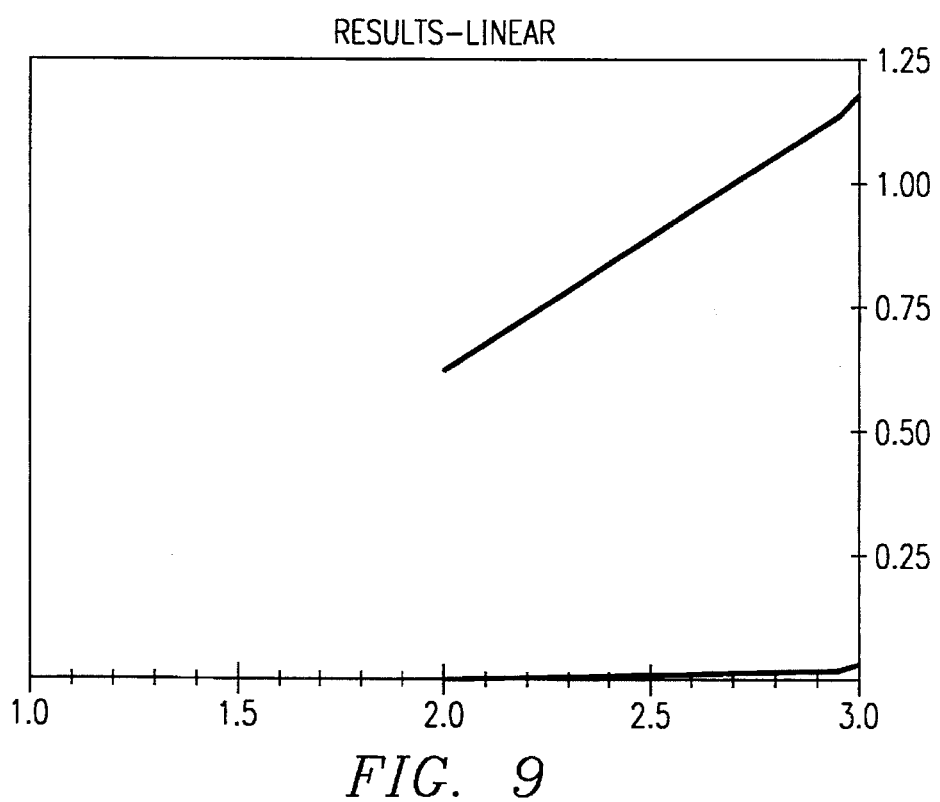

As shown in FIG. 8, the same test results are illustrated, but a semi-log graph coordinates are used. It should be noted that the above testing was discontinued when the number of bad stacks per stacking attempts per stack was reduced to less than one in a thousand, since this is probably below a practical limit caused by human error.

An additional test was conducted to evaluate the test results. To determine a benchmark for the above results, the procedure was rerun with 174 containers for 5,000 different ordered objects. However, the procedure only used Rule 1, such as the rule of not placing the object to be stacked on top of another object to be removed, such that a bad stacking arrangement resulted if that object to be stacked could be placed on another stack, resulting in an acceptable stacking arrangement. This test considered the fact that the stack was full. The results are shown in FIG. 8, and as a consequence, one can very clearly see that the results are noticeably worse than the case when the full set of rules are employed. However, the results are an improvement over randomly placing the object on stacks.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method for stacking objects to be stacked on a plurality of stacks including objects to be removed, comprises the steps of:
   comparing a removal order of an object to be stacked with removal orders of the objects to be removed; and
   placing the object to be stacked on a stack having an object to be removed with a removal order after the removal order of the object to be stacked.

2. A method for stacking objects to be stacked on a plurality of stacks including objects to be removed, comprising the steps of:
   determining a number of existing stacks and a maximum allowable number of stacks;
   comparing said number of existing stacks with said maximum allowable number of stacks;
   determining if a bad stacking sequence can be avoided by placement of the object to be stacked on an existing stack;
   creating a new stack if said bad stack sequence can't be avoided by placing the object to be stacked on one of said existing stacks and if said number of existing stacks are less than said maximum allowable number of stacks; and
   placing said object to be stacked on said new stack.

3. A method for stacking an object to be stacked on stacks including objects to be removed, comprising the steps of:
   determining a first number of objects to be stacked after the object to be stacked and to be removed from said stacks before the object to be stacked is to be removed from the stacks;
   determining a second number of objects to be stacked after the object to be stacked and to be removed from the stacks after the object to be stacked is to be removed from the stack;
   determining a target stack size to place the object to be stacked, said target stack size corresponding to said first number and said second number;
   determining a number of an object to be removed from said desired stack and a number of said objects to be stacked;
   determining a desired stack being the target stack size to place said object to be stacked by comparing said number of an object to be removed from said desired stack with said number of said objects to be stacked; and
   placing said object to be stacked on said desired stack.

4. A method as in claim 3, wherein said step to determine said target stack size further comprises the step of comparing said first number and said second member.

5. A method as in claim 3, wherein said step to determine said stack size further comprises the step of subtracting said first number from said second number.

6. A method as in claim 3, wherein said step to determine said stack size further comprises the step of subtracting said second number from said first number.

7. A method as in claim 3, wherein said step to determine said target stack size further comprises the step of setting said target stack size to one if the first number equals the second number.

8. A method as in claim 3, wherein said step to determine said stack size further comprises the step of choosing a new stack if the said first number is larger than the said second member.

9. A method as in claim 3, wherein said step to determine said stack size further comprises the step of setting the stack size to two if the second number is larger than said first number.

10. A method as in claim 3, wherein said stop of determining a stack further comprises the stop of determining the object to be removed from the stack most immediately after said object to be stacked.

11. A method as in claim 10, wherein said step of placing comprises a step of placing said object to be stacked on said stack having said most immediate object to be removed.

* * * * *